United States Patent [19]

Yamaura et al.

[11] Patent Number: 4,506,562
[45] Date of Patent: Mar. 26, 1985

[54] UNITARY AIR BLEED DEVICE

[75] Inventors: Tadao Yamaura; Susumu Nishihata, both of Tokyo, Japan

[73] Assignee: Nissan Motor Company, Limited, Yokohama, Japan

[21] Appl. No.: 594,411

[22] Filed: Mar. 28, 1984

Related U.S. Application Data

[63] Continuation of Ser. No. 230,432, Feb. 2, 1981, abandoned.

[30] Foreign Application Priority Data

Feb. 28, 1980 [JP] Japan ................. 55-24460

[51] Int. Cl.³ ............ F16H 57/02; F16K 15/14
[52] U.S. Cl. ................ 74/606 R; 137/846; 220/209; 220/374
[58] Field of Search ...... 220/373, 374, 209, DIG. 19; 137/846, 854; 138/89.4, 89.1; 74/606 R

[56] References Cited

U.S. PATENT DOCUMENTS 2,644,609  7/1953  Foss ..................................... 220/374
2,933,102  4/1960  Hillman et al. .
3,145,582  8/1964  Wagner ................................ 74/606
4,057,168  11/1977 Bosshold ............................ 220/209

FOREIGN PATENT DOCUMENTS 1987459   4/1968   Fed. Rep. of Germany .
1,376,717 12/1974  United Kingdom .
1535699   12/1978  United Kingdom .
1547023   6/1979   United Kingdom .

Primary Examiner—Kenneth J. Dorner
Attorney, Agent, or Firm—Schwartz, Jeffery, Schwaab, Mack, Blumenthal & Koch

[57] ABSTRACT

A unitary air bleed device of an elastomeric deformable material and has an integrally formed head portion with a vent hole and a cylindrical portion with a connecting passage formed therethrough. The connecting passage communicates with the vent hole of the head portion. The deformation of the air bleed device permits the air bleed device to be mounted to an enclosed housing by press fitting. When mounted, the cylindrical portion extends into the housing in such a direction to prevent the oil entry into the connecting passage.

5 Claims, 8 Drawing Figures

UNITARY AIR BLEED DEVICE

This application is a continuation of application Ser. No. 230,432, filed 2/2/81, now abandoned.

BACKGROUND OF THE INVENTION

1. Field of the Invention

The present invention relates to an air bleed device for an automotive vehicle enclosed housing, such as an axle housing or a gear housing.

2. Description of Prior Art

Generally, in the case of a power transmission device and the like of a vehicle, the meshing engagement of the gears generates heat within a housing of the device which raises the air temperature therein when the vehicle is in operation. When the vehicle is not in operation, the heat is dissipated to decrease the air temperature. This variation in temperature causes a pressure difference between air outside and inside of the housing. To prevent this, it is common to mount an air bleed device to said housing to provide communication between the inside and outside of the housing. Conventional air bleed devices of this kind are illustrated in FIGS. 7 and 8.

FIG. 7 shows a first conventional air bleed device A mounted to an axle housing 1 of the banjo type. According to this air bleed device A, a bolt 2, threadedly engaged with the housing 1, is formed with a connecting passage 3, and at the upper portion of said connecting passage 3, the bolt 2 is formed with a vent hole 4 communicating with the connecting passage 3, and a cap 5, formed at its peripheral edge portion with a cutout 5a, is mounted to cover said bolt 2 to prevent the entry of rain drops and dust into the connecting passage 3. On the inner side of the housing 1, a baffle 6 to cover said bolt 2 is welded in a manner to open on one side so as to prevent the lubricant oil flushed due to the centrifugal force of a rotating ring gear of a final gearing or of a differential device from flowing outwardly of the housing 1 through the connecting passage 3.

FIG. 8 shows a second conventional air bleed device A according to which a baffle 6 having a flange 6a is welded to a casing. A bolt having a connecting passage 3 drilled therethrough is threadedly engaged in said baffle 6, and a plate 16 is placed on the top upper surface of the bolt 2 and then covered by a cap 5 and with a spring 17 within said cap 5. The plate 16 is biased toward the head of the bolt 2 to close the connecting passage 3. With this construction, when the inner pressure of the housing 1 increases above a predetermined pressure, the plate 16 is urged against the predetermined resilient force of the spring 17 to open the connecting passage 3, and with this construction the entry of rain drops and dust is prevented.

However, these conventional air bleed devices A, require a large-number of component parts including baffle 6, bolt 2, cap 5, plate 16, spring and the like. In addition, since the baffle 6 is welded to the housing 1 and the bolt 2 is threadedly engaged with the housing 1 or baffle 6, the workability upon mounting the air bleed device A to the housing 1 is poor, thus inviting an increase in weight and cost.

SUMMARY OF THE INVENTION

The present invention has been effected in recognition of these problems and an object thereof is to solve the above-mentioned problems.

According to the present invention, a unitary air bleed device comprises a head portion and a cylindrical portion which are integrally formed as one piece from an elastomeric deformable material and which can be mounted to an enclosed housing by press fitting using the deformable characteristic of the material. The air bleed device has a waist portion which engages a mating hole and which is oriented such that the cylindrical portion extends into the housing in a direction to prevent the entry of oil flushed from rotating elements in the housing into a connecting passage formed through the cylindrical portion. Thus, airflow communication between the interior and exterior of the housing is assured while preventing the oil from spraying outwardly of the housing through the air bleed device.

DESCRIPTION OF THE PREFERRED EMBODIMENTS

Figure 1:
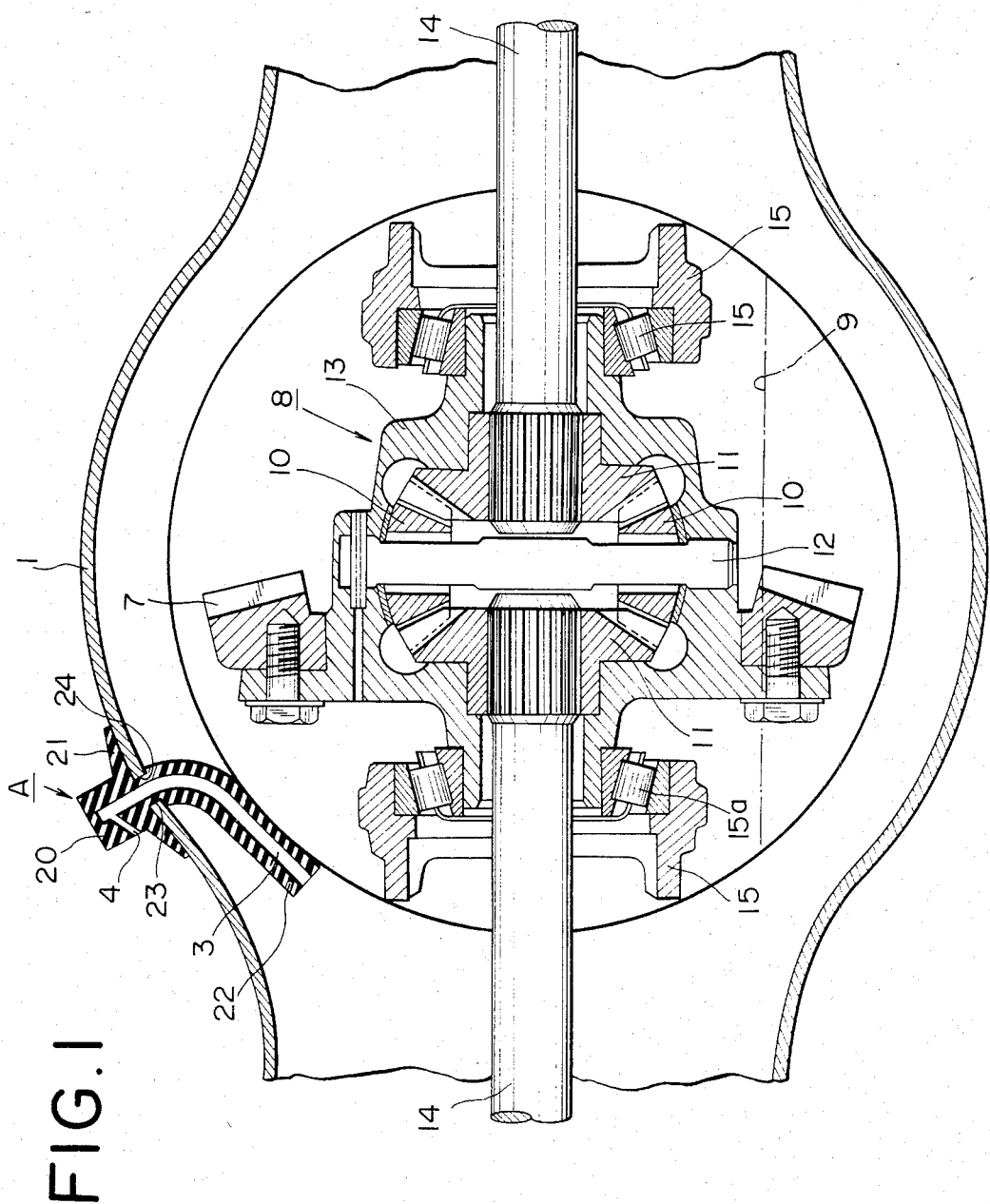
FIG. 1 is a sectional view of a final gearing having a housing to which a preferred embodiment of an air bleed according to the present invention is mounted.
Figure 2:
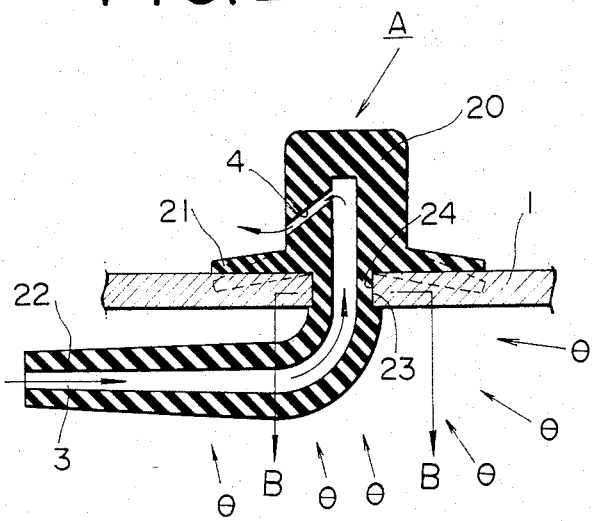
FIG. 2 is an enlarged fragmentary view of the air bleed device shown in FIG. 1.
Figure 3:
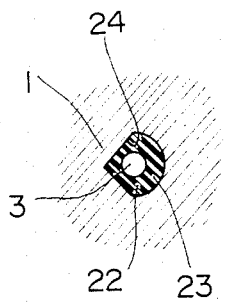
FIG. 3 is a cross section taken through the line III—III of FIG. 2.

Referring to FIGS. 1 through 3, the preferred embodiment of an air bleed device according to the present invention is explained.

Firstly, explaining its construction, A designates a unitary air bleed device according to the present invention mounted to an upper portion of an axle housing 1 of the banjo type. Said air bleed device A is made of a head portion 20, a flange 21 and a cylindrical portion 22 which are integrally formed in one piece from an elastomerically deformable material, for example, a synthetic rubber or the like. The head portion 20 is formed with a vent hole 4 whose outer end is opened as directed downwardly, while, the cylindrical portion 22 is formed with a connecting passage communicating the interior of the housing 1 with said vent hole 4. Said connecting passage extends axially through the cylindrical portion 22 and extends also into the head portion 20 and communicates at its upper end with said vent hole 4.

Said cylindrical portion 22 takes an angle from 90° to 180° with respect to directions $\theta$ (FIG. 2) in which the later described lubricant oil 9 flushes. As shown in broken lines in FIG. 2, it is desirable that in its free state before mounting to the housing 1, the flange is flexed toward the cylindrical portion 22 to form a bevel shape. Formed on the upper edge of the cylindrical portion 22 is a waist portion 23 which is slightly reduced in diameter and which waist portion 23 has a cross section as shown in FIG. 3 so as to assure said cylindrical portion 22 will be oriented in the proper direction. The housing 1 is formed with a mating hole 24 having a shape mating with the waist portion 23 of said cylindrical portion.

In FIG. 1, 7 designates a ring gear which meshes with drive pinions to form a final gearing. 8 designates a differential unit which comprises differential pinions, side gears 11, a pinion shaft 12, etc. The numeral 13 designates a differential case. Axle shafts splined to said side gears 11, respectively. The numerals 15 designates side bearings which supports, via roller bearings 15a, the differential case 13. The numeral 9 designates a lubricant oil within the housing 1 which functions to effect lubrication of said final gearing and differential unit 8.

The operation is hereinafter explained.

Mounting of the air bleed device A is effected by pressing the cylindrical portion 22 with its lower end engaged in the mating hole 24 of the housing 1 inwardly until the constricted waist portion 23 fits in the mating hole 24. Then, the orientation of the cylindrical portion 22 is determined by engaging the waist portion 23 in agreement with the shape of the mating hole 24. As the cylindrical portion 22 is made of the same elastomerically deformable material as the waist portion 20 and the flange 21, by exerting a relatively strong pressing force, the portion of the cylindrical portion 22 having a large diameter can pass through said coupling hole 24, thus making said fitting of the waist portion 23 easy. During the fitting of waist portion 24 in the mating hole 24, the flange 21 which had taken the bevel shape, with its periphery flexing toward the waist portion 22, is pressed into contact with the surface of the housing 1 to deform in conformity with the contour of the surface of the housing 1.

As the cylindrical portion 22 is arranged when the air bleed device A is mounted to be angled from 90° to 180° with respect to the directions $\theta$ in which the lubricant oil 9 flush, any flushing lubricant oil 9 due to the rotation of the ring gear 7 and the differential unit 8 will not enter the connecting passage 3. Thus, there is no possibility that the lubricant oil sprays outwardly of the housing 1 through the air bleed device A. As the interior and exterior of the housing 1 communicate with each other through the connecting passage 3 and the vent hole 4, a change in air pressure within the housing 1 induces a flow of air through said passage 3 and hole 4 so as to maintain the air pressure within the housing 1 at a substantially constant value. As the vent hole 4 opens downwardly at its outlet, it cooperates with the connecting passage 3 to form a maze. This makes it difficult for dust and water drops to enter into the housing 1 through the connecting passage 4.

When the air bleed device A is to be removed from the housing 1, it is only necessary to pull the head portion 20 upwardly with a relatively strong force to deform the shoulder portion below the waist portion 23 to make the removal easy.

Figure 4:
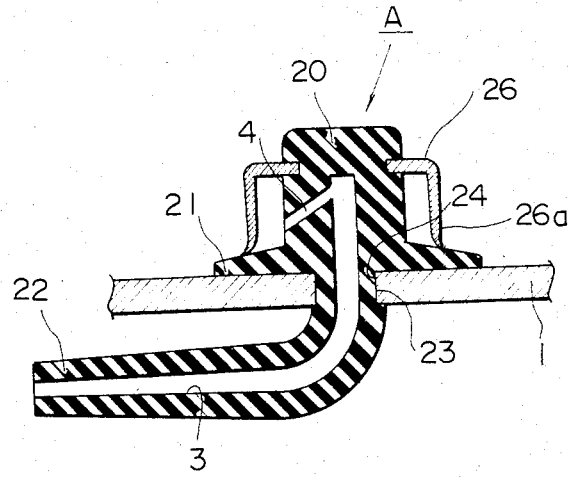
FIG. 4 is a view similar to FIG. 2 of a second embodiment of an air bleed device according to the present invention.
Figure 5:
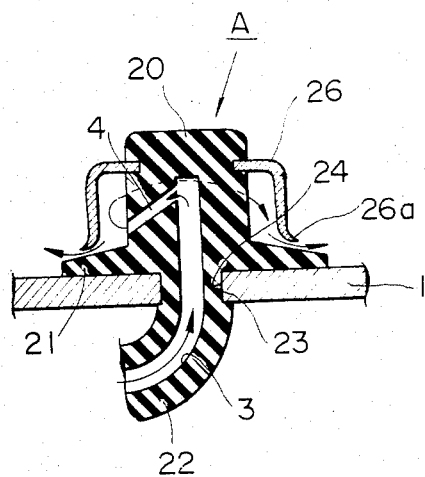
FIGS. 5 and 6 show opening states of the vent valve used in FIG. 4.
Figure 6:
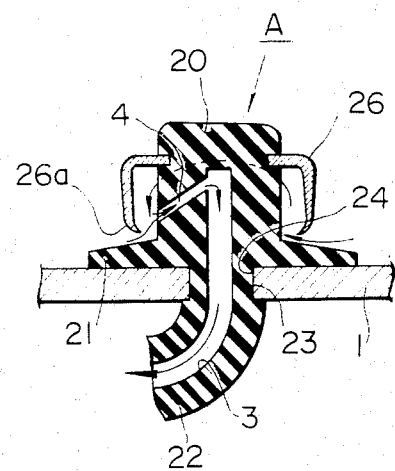
Figure 7:
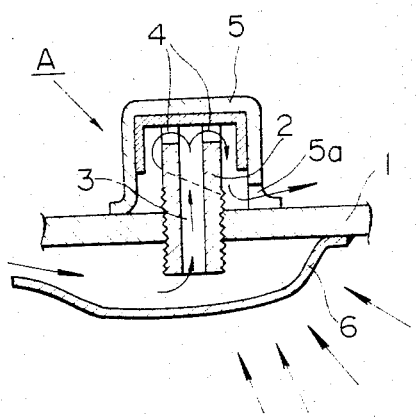
FIGS. 7 and 8 are views similar to FIGS. 2 and 4 illustrating the above mentioned first and second conventional air bleed devices.
Figure 8:
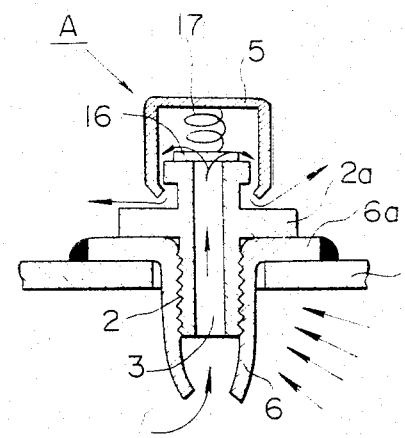

FIGS. 4 to 6 show another embodiment. This embodiment of the air bleed device A is different from that of FIGS. 1-3 in that a cap 26 is mounted to the head portion 20. The peripheral portion 26a of the cap 26 is flexible such that it flexes inwardly or outwardly in response to the difference between pressure inside of and pressure outside of the cap 26. Said peripheral edge portion 26a is adapted to contact the upper surface of the flange 21, thus forming a vent valve. The outflow of air from the interior of the housing 1 is permitted by the opening of the vent valve when as shown in FIG. 5 the peripheral edge portion 26a is flexed outwardly in response to the pressure, thus allowing the excess air in the housing 1, to flow outwardly. Inflow of air toward the interior of the housing is permitted by opening the vent valve when the peripheral edge 26a is flexed inwardly, as shown in FIG. 6 in response to the exterior pressure, thus allowing air to flow into the housing 1. As far as the difference in pressure between the interior and exterior of the housing 1 falls within a predetermined value, there is no outflow and inflow of air because the vent valve is closed when the peripheral edge portion 26a contacts the flange 21 as shown in FIG. 4. In this position any inflow of dust or water drops into the housing 1 is prevented in addition to its inherent function of maintaining the air pressure within the housing 1 at a predetermined value. The air pressure within the housing 1 can be varied if the elasticity of said peripheral edge portion 26a is varied to change the predetermined value. All other aspects of the construction and operation are identical to those of the embodiment shown in FIGS. 1 to 3.

Although in each of the above-mentioned embodiments, the elastomeric material is used for forming the air bleeder, the air bleed device may be formed of a plastically deformable material, such as soft metal, so as to plastically deform upon mounting the air bleed device on the housing 1 by press fit because it is unlikely that the air bleed device will require removal.

As having been described, an air bleed device according to the present invention has a reduced number of component parts work for mounting has been made easy, the weight has been lightened, and the cost has been lowered because the head portion of the air bleed device, flange and cylindrical portion are formed as one piece. The cylindrical portion is used to function as a baffle, that is, the cylindrical portion is angled in a direction intersecting the flushing directions of the lubricant oil. Further, the mounting work can be carried out easily because the air bleed device is press fitted into the housing.

What is claimed is:

1. An air bleed device for a housing having a mating hole, said housing enclosing an automotive component which is lubricated by oil, said air bleed device comprising:
   a head portion having a vent hole formed therein;
   a cylindrical portion having a connecting passage therethrough in communication with said vent hole of said head portion, said cylindrical portion having a waist portion adapted to engage said mating hole, said cylindrical portion being operable to be inclined with respect to an axis of said mating hole to thereby extend into said housing in a predetermined direction inclined with respect to a flushing direction of said oil, said waist portion and said mating hole having complimentary cross sections with means for permitting said cylindrical portion to be inserted in said mating hole only in said predetermined direction.

2. The air bleed device of claim 1, wherein said vent hole opens toward an exterior surface of said housing.

3. The air bleed device of claim 1, wherein said head portion and cylindrical portion form an elastomeric body operable to be removably mounted, by press fitting, into said housing by deformation of said elastomeric body.

4. The device of claim 1 wherein said mating hole and waist portion cooperate to prevent rotation of said device from said predetermined direction after insertion into said mating hole.

5. An air bleed device for a housing having a mating hole, said housing enclosing an automotive component which is lubricated by oil, said air bleed device comprising:

a head portion having a vent hole formed therein and a flange portion for engaging an exterior surface of said housing;

a cylindrical portion having a connecting passage therethrough in communication with said vent hole of said head portion, said head portion and cylindrical portion forming an elastomeric body operable to be removably mounted, by press fitting, into said housing by deformation of said elastomeric body whereby said vent hole opens into said housing, said cylindrical portion having a waist portion adapted to engage said mating hole, said cylindrical portion being operable to be inclined with respect to an axis of said mating hole to thereby extend into said housing in a predetermined direction inclined with respect to a flushing direction of said oil, said waist portion and said mating hole having complimentary cross sections operable to firmly orient said cylindrical portion in said predetermined direction; and a cap engaging said head portion and having a peripheral edge portion contacting said flange portion to define a chamber between said cap, said head portion, and said flange portion, wherein said peripheral edge portion is operable to flex out of contact with said flange portion in response to a predetermined pressure differential between an inside and outside said housing.

* * * * *